US010488071B2

(12) United States Patent
Fradkin et al.

(10) Patent No.: US 10,488,071 B2
(45) Date of Patent: Nov. 26, 2019

(54) PACKAGED TERMINAL AIR CONDITIONER UNIT WITH VENT DOOR POSITION DETECTION

(71) Applicant: Haier US Appliance Solutions, Inc., Wilmington, DE (US)

(72) Inventors: Mike Fradkin, Louisville, KY (US); Zachary Chapin, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 528 days.

(21) Appl. No.: 15/433,006

(22) Filed: Feb. 15, 2017

(65) Prior Publication Data
US 2018/0231266 A1 Aug. 16, 2018

(51) Int. Cl.
| | |
|---|---|
| F24F 13/10 | (2006.01) |
| F24F 11/79 | (2018.01) |
| F24F 1/027 | (2019.01) |
| F24F 13/14 | (2006.01) |
| F24F 11/77 | (2018.01) |
| F24F 11/30 | (2018.01) |
| F24F 140/40 | (2018.01) |
| F24F 110/00 | (2018.01) |
| F24F 140/60 | (2018.01) |

(52) U.S. Cl.
CPC .............. *F24F 11/79* (2018.01); *F24F 1/027* (2013.01); *F24F 11/30* (2018.01); *F24F 11/77* (2018.01); *F24F 13/14* (2013.01); *F24F 2110/00* (2018.01); *F24F 2140/40* (2018.01); *F24F 2140/60* (2018.01)

(58) Field of Classification Search
CPC .. F24F 11/79; F24F 11/77; F24F 11/30; F24F 1/027; F24F 13/14; F24F 2140/40; F24F 2140/60; F24F 2110/00
USPC ......................................................... 454/333
See application file for complete search history.

(56) References Cited

U.S. PATENT DOCUMENTS

| | | |
|---|---|---|
| 4,456,166 A | 6/1984 | Kagohata |
| 5,461,875 A | 10/1995 | Lee et al. |
| 5,857,343 A | 1/1999 | Lee et al. |

*Primary Examiner* — Helena Kosanovic
(74) *Attorney, Agent, or Firm* — Dority & Manning, P.A.

(57) ABSTRACT

A packaged terminal air conditioner unit (PTAC) and methods of operating the same are provided. The PTAC includes a bulkhead having a vent aperture through which an auxiliary fan urges a flow of make-up air into the room and a vent door for controlling the flow of make-up air. A method for detecting the position of the vent door includes operating the auxiliary fan at a first power level to reach a target speed, switching the position of the vent door, and operating the auxiliary fan at a second power level to maintain the target speed. The first power level and the second power level are compared to determine whether the vent door is in the open position or the closed position, with an increased power level indicating that the door is closed and a decreased power level indicating that the door is open.

20 Claims, 15 Drawing Sheets

PACKAGED TERMINAL AIR CONDITIONER UNIT WITH VENT DOOR POSITION DETECTION

FIELD OF THE INVENTION

The present disclosure relates generally to air conditioner units, and more particularly to air conditioner units that utilize an improved system for make-up air.

BACKGROUND OF THE INVENTION

Air conditioner or conditioning units are conventionally utilized to adjust the temperature indoors—i.e. within structures such as dwellings and office buildings. Such units commonly include a closed refrigeration loop to heat or cool the indoor air. Typically, the indoor air is recirculated while being heated or cooled. A variety of sizes and configurations are available for such air conditioner units. For example, some units may have one portion installed within the indoors that is connected, by e.g., tubing carrying the refrigerant, to another portion located outdoors. These types of units are typically used for conditioning the air in larger spaces.

Another type of unit, sometimes referred to as a packaged terminal air conditioner unit (PTAC), may be used for somewhat smaller indoor spaces that are to be air conditioned. These units may include both an indoor portion and an outdoor portion separated by a bulkhead and may be installed in windows or positioned within an opening of an exterior wall of a building.

Frequently, the indoor space may need to draw in air from the outdoors. For example, if a bathroom fan is turned on or air is otherwise ejected from the indoor space, fresh air may be required to supplement or make-up for the lost air. Depending on e.g., the efficiency of the weather stripping around doors and windows, this make-up air may simply be drawn into the indoors by cracks or other openings. If such cracks are not sufficient, the flow of make-up air may be insufficient or too slow. Notably, government regulations including e.g., fire codes may require that cracks or openings be eliminated as much as possible—precluding a sufficient flow of make-up air.

Accordingly, certain PTACs allow for the introduction of make-up air into the indoor space. In this regard, PTACs may include a vent aperture defined in the bulkhead that separates the indoor and outdoor side of the unit. The vent aperture allows fresh air to pass from the outdoor side of the PTAC into the conditioned room. The vent aperture is usually equipped with an auxiliary fan to urge the flow of make-up air and a motorized vent door to control the flow of make-up air.

Therefore, it is important to be able to detect whether the vent door is open or closed. Certain PTACs include sensors for determining the position of the vent door. For example, proximity sensors, reed switches, or similar devices can be used to detect the position of vent door. However, all these devices increase costs and complicate the design of the PTAC. Accordingly, improved air conditioner units and associated methods for detecting the position of the vent door would be useful. More specifically, packaged terminal air conditioner units and associated methods of operation that can detect the vent door position without the need for complicated and costly sensors would be particularly beneficial.

BRIEF DESCRIPTION OF THE INVENTION

The present subject matter provides a packaged terminal air conditioner unit (PTAC) and methods of operating the same. The PTAC includes a bulkhead having a vent aperture through which an auxiliary fan urges a flow of make-up air into the room and a vent door for controlling the flow of make-up air. A method for detecting the position of the vent door includes operating the auxiliary fan at a first power level to reach a target speed, switching the position of the vent door, and operating the auxiliary fan at a second power level to maintain the target speed. The first power level and the second power level are compared to determine whether the vent door is in the open position or the closed position, with an increased power level indicating that the door is closed and a decreased power level indicating that the door is open. Additional aspects and advantages of the invention will be set forth in part in the following description, may be obvious from the description, or may be learned through practice of the invention.

In accordance with one embodiment, a packaged terminal air conditioner unit is provided. The PTAC includes a bulkhead defining an indoor portion and an outdoor portion, a vent aperture defined in the bulkhead, and an auxiliary fan positioned proximate the vent aperture and being configured for urging a flow of make-up air from the outdoor portion through the vent aperture to the indoor portion. A vent door is positioned proximate the vent aperture and is pivotable between an open position for allowing the flow of make-up air through the vent aperture and a closed position for blocking the flow of make-up air through the vent aperture. A controller is operably coupled to the auxiliary fan and the vent door. The controller is configured for providing a first fan control signal to operate the auxiliary fan at a target speed and moving the vent door from the open position to the closed position or from the closed position to the open position. The controller is further configured for providing a second fan control signal to operate the auxiliary fan at the target speed and determining whether the vent door is in the open position or the closed position by comparing the first fan control signal and the second fan control signal.

In accordance with another embodiment, a method for detecting a position of a vent door of a packaged terminal air conditioner unit is provided. The vent door is pivotally mounted over a vent aperture defined in a bulkhead of the PTAC and is movable between an open position and a closed position. The PTAC includes an auxiliary fan for urging a flow of make-up air through the vent aperture. The method includes operating the auxiliary fan at a first power level to reach a target speed and moving the vent door from the open position to the closed position or from the closed position to the open position. The method further includes operating the auxiliary fan at a second power level to maintain the target speed, comparing the first power level to the second power level, and determining that the vent door is in the open position if the second power level is lower than the first power level or in the closed position if the second power level is higher than the first power level.

According to still another exemplary embodiment, a method for detecting a position of a vent door of a packaged terminal air conditioner unit is provided. The vent door is pivotally mounted over a vent aperture defined in a bulkhead of the PTAC and is movable between an open position and a closed position. The PTAC includes an auxiliary fan for urging a flow of make-up air through the vent aperture. The method includes operating the auxiliary fan at a power level to reach a target speed and determining that the vent door is in the open position or the closed position based on the power level.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
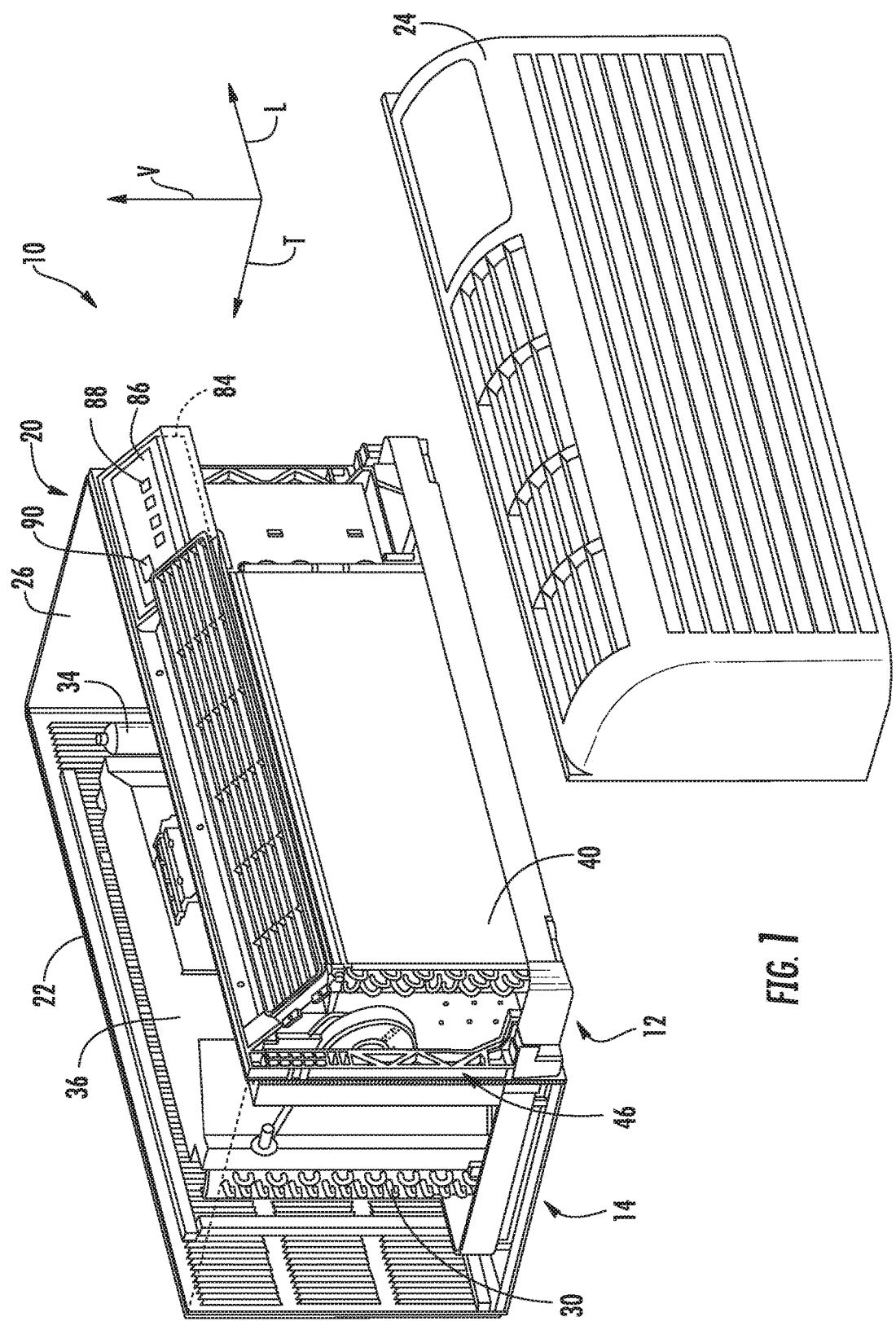
FIG. 1 provides a perspective view of an air conditioner unit, with part of an indoor portion exploded from a remainder of the air conditioner unit for illustrative purposes, in accordance with one exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an air conditioner unit 10 is provided. The air conditioner unit 10 is a one-unit type air conditioner, also conventionally referred to as a room air conditioner or a packaged terminal air conditioner (PTAC). The unit 10 includes an indoor portion 12 and an outdoor portion 14, and generally defines a vertical direction V, a lateral direction L, and a transverse direction T. Each direction V, L, T is perpendicular to each other, such that an orthogonal coordinate system is generally defined.

A housing 20 of the unit 10 may contain various other components of the unit 10. Housing 20 may include, for example, a rear grill 22 and a room front 24 which may be spaced apart along the transverse direction T by a wall sleeve 26. The rear grill 22 may be part of the outdoor portion 14, and the room front 24 may be part of the indoor portion 12. Components of the outdoor portion 14, such as an outdoor heat exchanger 30, a outdoor fan 32, and a compressor 34 may be housed within the wall sleeve 26. A casing 36 may additionally enclose the outdoor fan, as shown.

Figure 2:
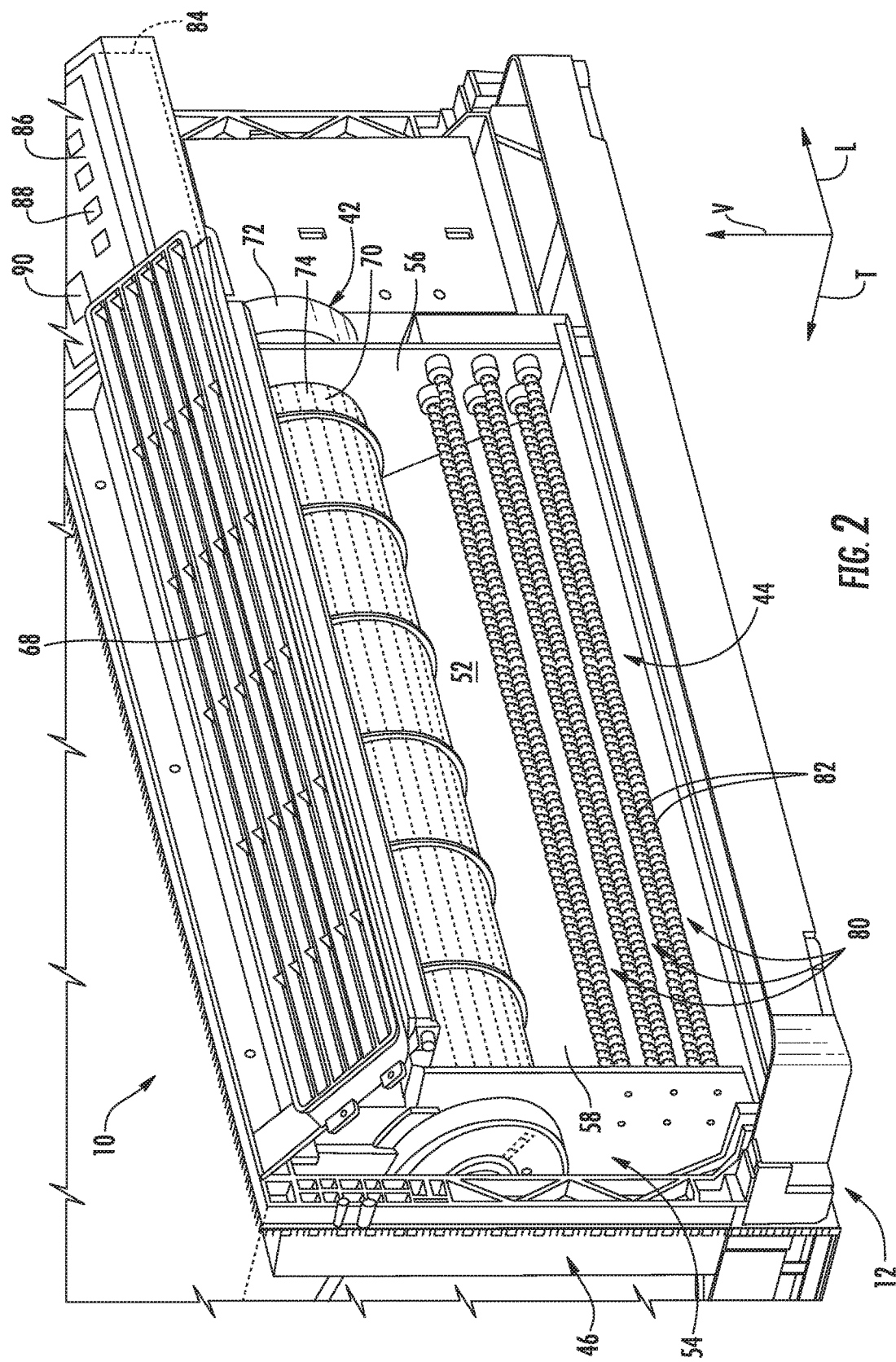
FIG. 2 is a perspective view of components of an indoor portion of an air conditioner unit in accordance with one exemplary embodiment of the present disclosure.

Referring now also to FIG. 2, indoor portion 12 may include, for example, an indoor heat exchanger 40, a blower fan 42, and a heating unit 44. These components may, for example, be housed behind the room front 24. Additionally, a bulkhead 46 may generally support and/or house various other components or portions thereof of the indoor portion 12, such as the blower fan 42 and the heating unit 44. Bulkhead 46 may generally separate and define the indoor portion 12 and outdoor portion 14.

Figure 3:
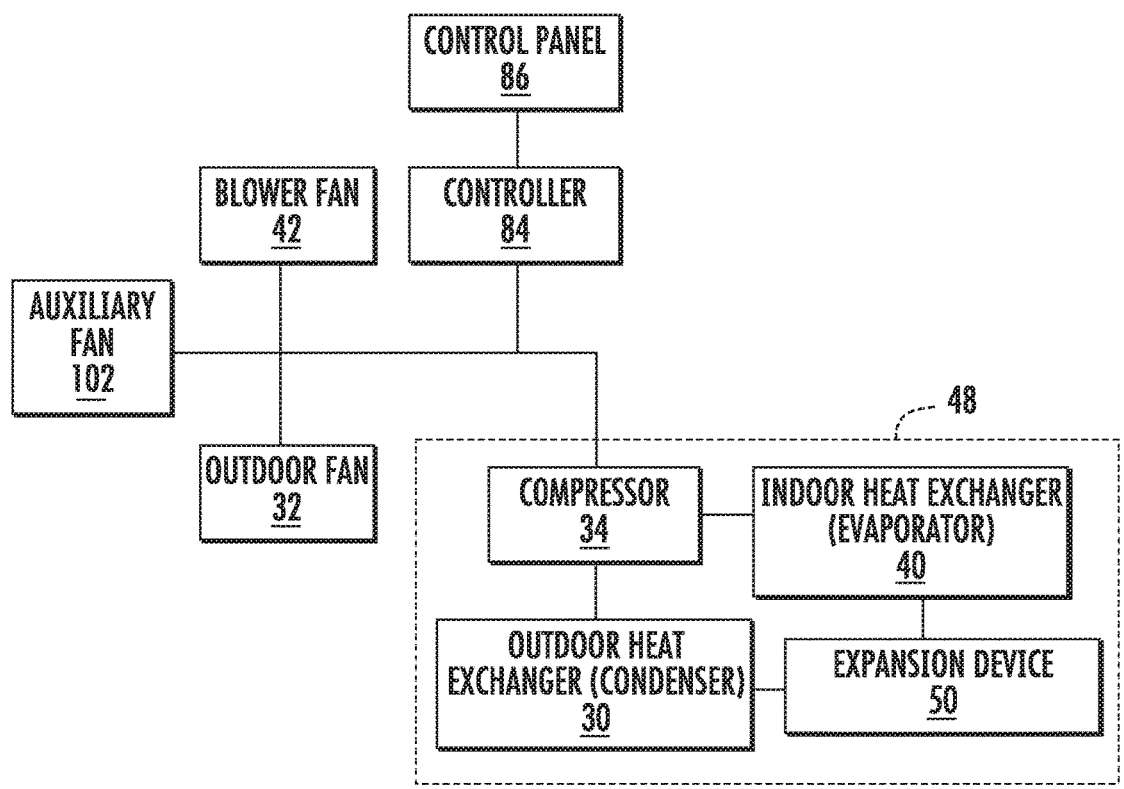
FIG. 3 is a schematic view of a refrigeration loop in accordance with one embodiment of the present disclosure.
Figure 6:
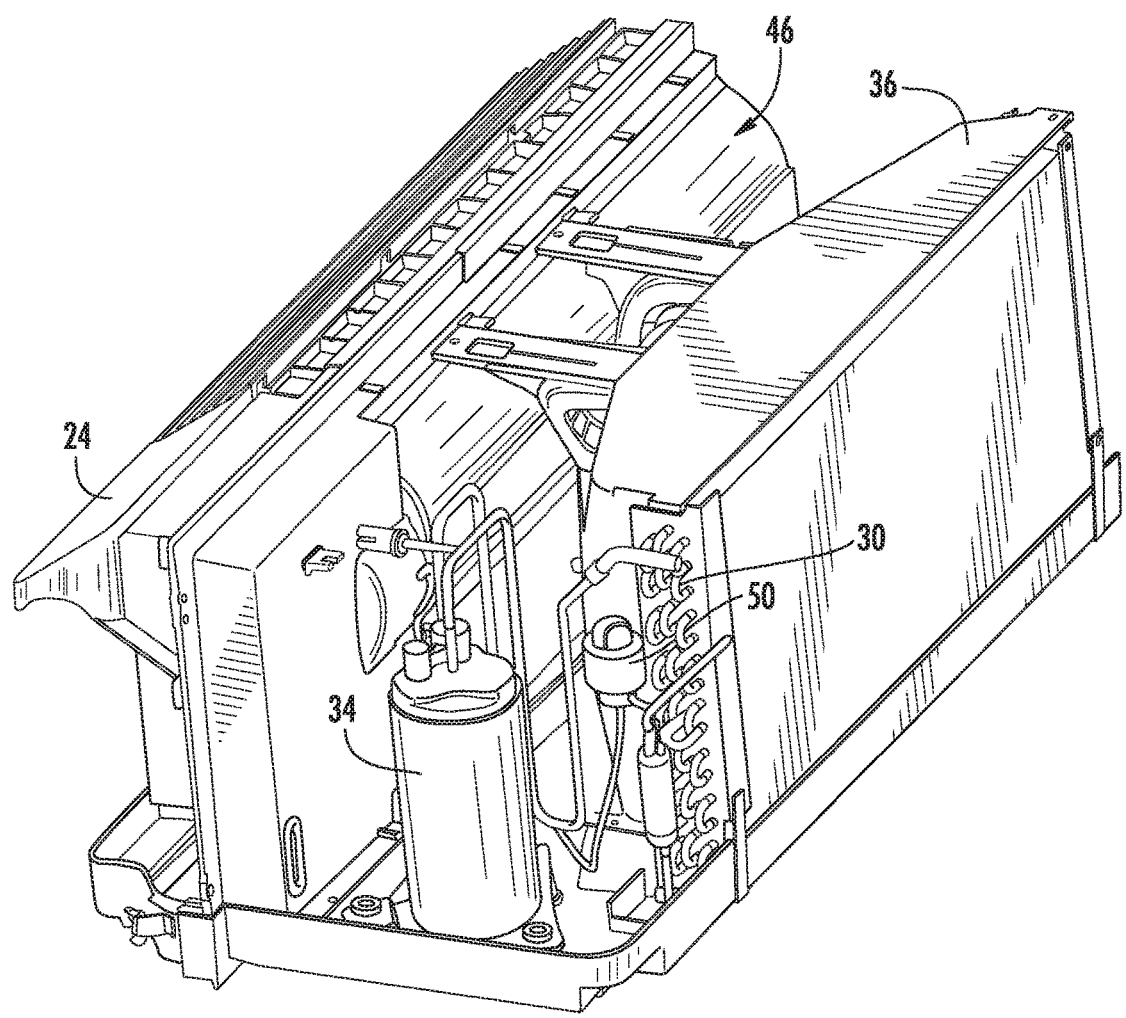
FIG. 6 is a rear perspective view of components of an outdoor portion of an air conditioner unit in accordance with one embodiment of the present disclosure.
Figure 7:
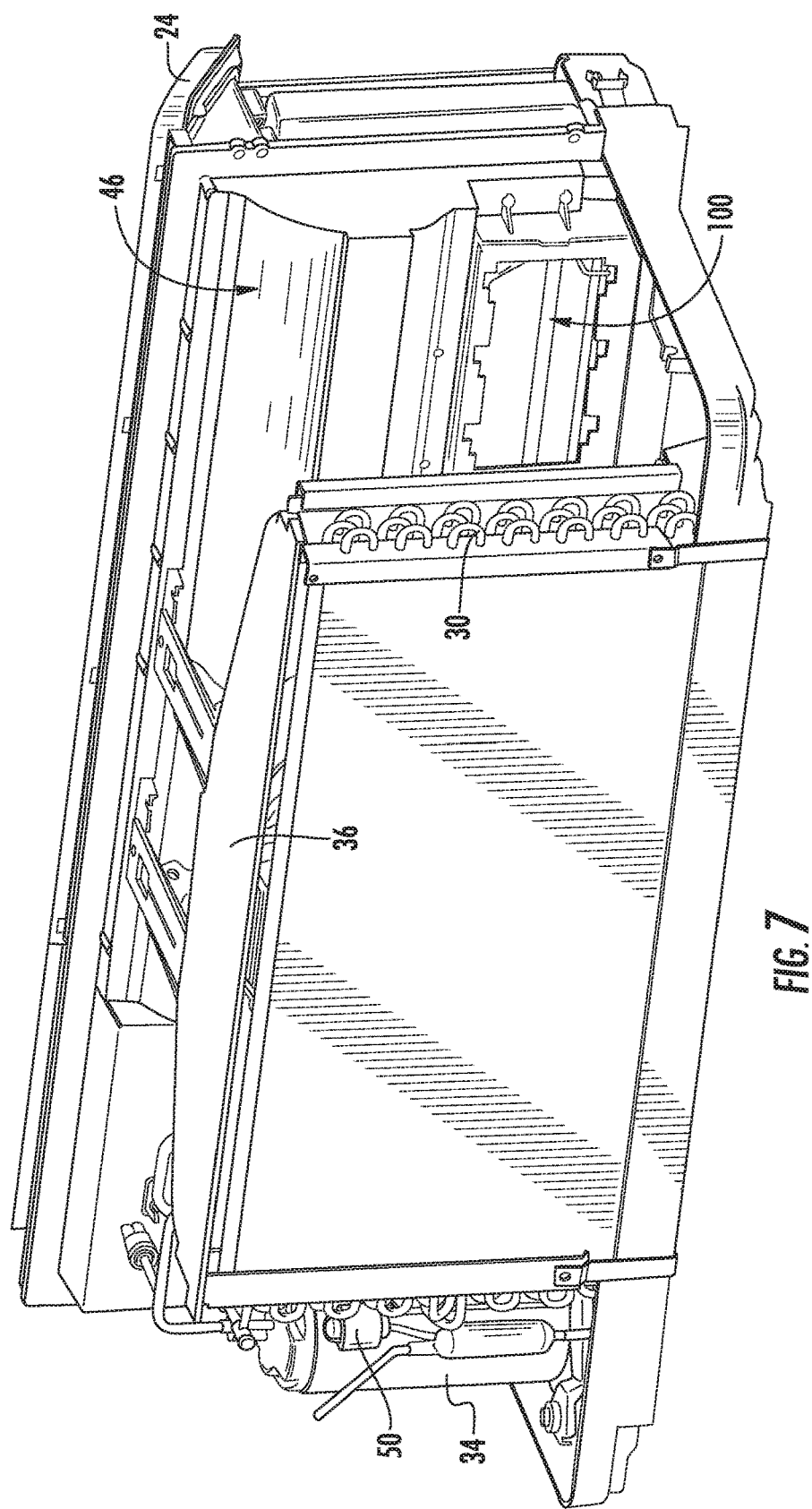
FIG. 7 is a rear perspective view of components of an outdoor portion of an air conditioner unit in accordance with one embodiment of the present disclosure.
Figure 8:
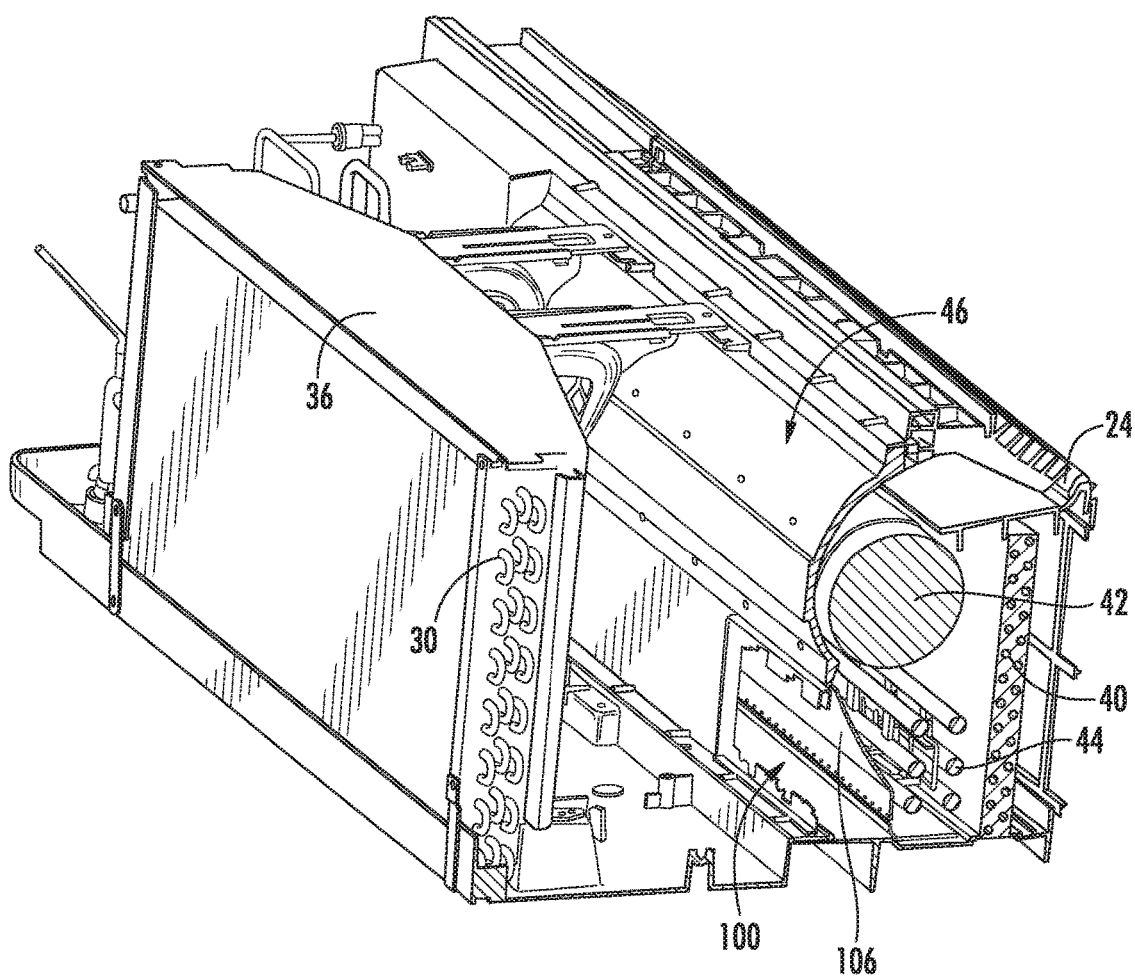
FIG. 8 is a perspective section view of components of an air conditioner unit in accordance with one embodiment of the present disclosure.

Outdoor and indoor heat exchangers 30, 40 may be components of a refrigeration loop 48, which is shown schematically in FIG. 3. Refrigeration loop 48 may, for example, further include compressor 34 and an expansion device 50 (see also FIG. 6). As illustrated, compressor 34 and expansion device 50 may be in fluid communication with outdoor heat exchanger 30 and indoor heat exchanger 40 to flow refrigerant therethrough as is generally understood. More particularly, refrigeration loop 48 may include various lines for flowing refrigerant between the various components of refrigeration loop 48, thus providing the fluid communication there between. Refrigerant may thus flow through such lines from indoor heat exchanger 40 to compressor 34, from compressor 34 to outdoor heat exchanger 30, from outdoor heat exchanger 30 to expansion device 50, and from expansion device 50 to indoor heat exchanger 40. The refrigerant may generally undergo phase changes associated with a refrigeration cycle as it flows to and through these various components, as is generally understood. One suitable refrigerant for use in refrigeration loop 48 is 1,1,1, 2-Tetrafluoroethane, also known as R-134A, although it should be understood that the present disclosure is not limited to such example and rather that any suitable refrigerant may be utilized.

As is understood in the art, refrigeration loop 48 may be alternately be operated as a refrigeration assembly (and thus perform a refrigeration cycle) or a heat pump (and thus perform a heat pump cycle). As shown in FIG. 3, when refrigeration loop 48 is operating in a cooling mode and thus performs a refrigeration cycle, the indoor heat exchanger 40 acts as an evaporator and the outdoor heat exchanger 30 acts as a condenser. Alternatively, when the assembly is operating in a heating mode and thus performs a heat pump cycle, the indoor heat exchanger 40 acts as a condenser and the outdoor heat exchanger 30 acts as an evaporator. The outdoor and indoor heat exchangers 30, 40 may each include coils through which a refrigerant may flow for heat exchange purposes, as is generally understood.

According to an example embodiment, compressor 34 may be a variable speed compressor. In this regard, compressor 34 may be operated at various speeds depending on the current air conditioning needs of the room and the demand from refrigeration loop 48. For example, according to an exemplary embodiment, compressor 34 may be configured to operate at any speed between a minimum speed, e.g., 1500 revolutions per minute (RPM), to a maximum rated speed, e.g., 3500 RPM. Notably, use of variable speed compressor 34 enables efficient operation of refrigeration loop 48 (and thus air conditioner unit 10), minimizes unnecessary noise when compressor 34 does not need to operate at full speed, and ensures a comfortable environment within the room.

In exemplary embodiments as illustrated, expansion device 50 may be disposed in the outdoor portion 14 between the indoor heat exchanger 40 and the outdoor heat exchanger 30. According to the exemplary embodiment, expansion device 50 may be an electronic expansion valve that enables controlled expansion of refrigerant, as is known in the art. More specifically, electronic expansion device 50 may be configured to precisely control the expansion of the refrigerant to maintain, for example, a desired temperature differential of the refrigerant across the indoor heat exchanger 40. In other words, electronic expansion device 50 throttles the flow of refrigerant based on the reaction of the temperature differential across indoor heat exchanger 40 or the amount of superheat temperature differential, thereby ensuring that the refrigerant is in the gaseous state entering compressor 34. According to alternative embodiments, expansion device 50 may be a capillary tube or another suitable expansion device configured for use in a thermodynamic cycle.

Bulkhead 46 may include various peripheral surfaces that define an interior 52 thereof. For example, and additionally referring to FIG. 4, bulkhead 46 may include a first sidewall 54 and a second sidewall 56 which are spaced apart from each other along the lateral direction L. A rear wall 58 may extend laterally between the first sidewall 54 and second sidewall 56. The rear wall 58 may, for example, include an upper portion 60 and a lower portion 64. Lower portion 64 may have a generally linear cross-sectional shape, and may be positioned below upper portion 60 along the vertical direction V. Rear wall 58 may further include an indoor facing surface and an opposing outdoor facing surface. The indoor facing surface may face the interior 52 and indoor portion 12, and the outdoor facing surface may face the outdoor portion 14. Bulkhead 46 may additionally extend between a top end 62 and a bottom end 66 along vertical axis V. Upper portion 60 may, for example, include top end 62, while lower portion 64 may, for example, include bottom end 66. Bulkhead 46 may additionally include, for example, an air diverter 68, which may extend between the sidewalls 54, 56 along the lateral direction L and which may flow air therethrough.

Upper portion 60 may have a generally curvilinear cross-sectional shape, and may accommodate a portion of the blower fan 42, which may be, for example, a centrifugal fan. Alternatively, however, any suitable fan type may be utilized. Blower fan 42 may include a blade assembly 70 and a motor 72. The blade assembly 70, which may include one or more blades disposed within a fan housing 74, may be disposed at least partially within the interior 52 of the bulkhead 46, such as within the upper portion 60. As shown, blade assembly 70 may for example extend along the lateral direction L between the first sidewall 54 and the second sidewall 56. The motor 72 may be connected to the blade assembly 70, such as through the housing 74 to the blades via a shaft. Operation of the motor 72 may rotate the blades, thus generally operating the blower fan 42. Further, in exemplary embodiments, motor 72 may be disposed exterior to the bulkhead 46. Accordingly, the shaft may for example extend through one of the sidewalls 54, 56 to connect the motor 72 and blade assembly 70.

Notably, according to an exemplary embodiment, outdoor fan 32 and blower fan 42 are variable speed fans. For example, referring to blower fan 42, motor 72 may be configured to rotate blade assembly 70 at different rotational speeds, thereby generating different air flow rates through blower fan 42. It may be desirable to operate fans 32, 42 at less than their maximum rated speed to ensure safe and proper operation of refrigeration loop 48 at less than its maximum rated speed, e.g., to reduce noise when full speed operation is not needed. In addition, according to alternative embodiments, fans 32, 42 may be operated to urge make-up air into the room.

According to the illustrated embodiment, blower fan 42 may operate as an evaporator fan in refrigeration loop 48 to encourage the flow of air through indoor heat exchanger 40. Accordingly, blower fan 42 may be positioned downstream of indoor heat exchanger 40 along the flow direction of indoor air and downstream of heating unit 44 along the flow direction of outdoor air (when make-up air is being supplied). Alternatively, blower fan 42 may be positioned upstream of indoor heat exchanger 40 along the flow direction of indoor air, and may operate to push air through indoor heat exchanger 40.

Heating unit 44 in exemplary embodiments includes one or more heater banks 80. Each heater bank 80 may be operated as desired to produce heat. In some embodiments as shown, three heater banks 80 may be utilized. Alternatively, however, any suitable number of heater banks 80 may be utilized. Each heater bank 80 may further include at least one heater coil or coil pass 82, such as in exemplary embodiments two heater coils or coil passes 82. Alternatively, other suitable heating elements may be utilized.

Figure 9:
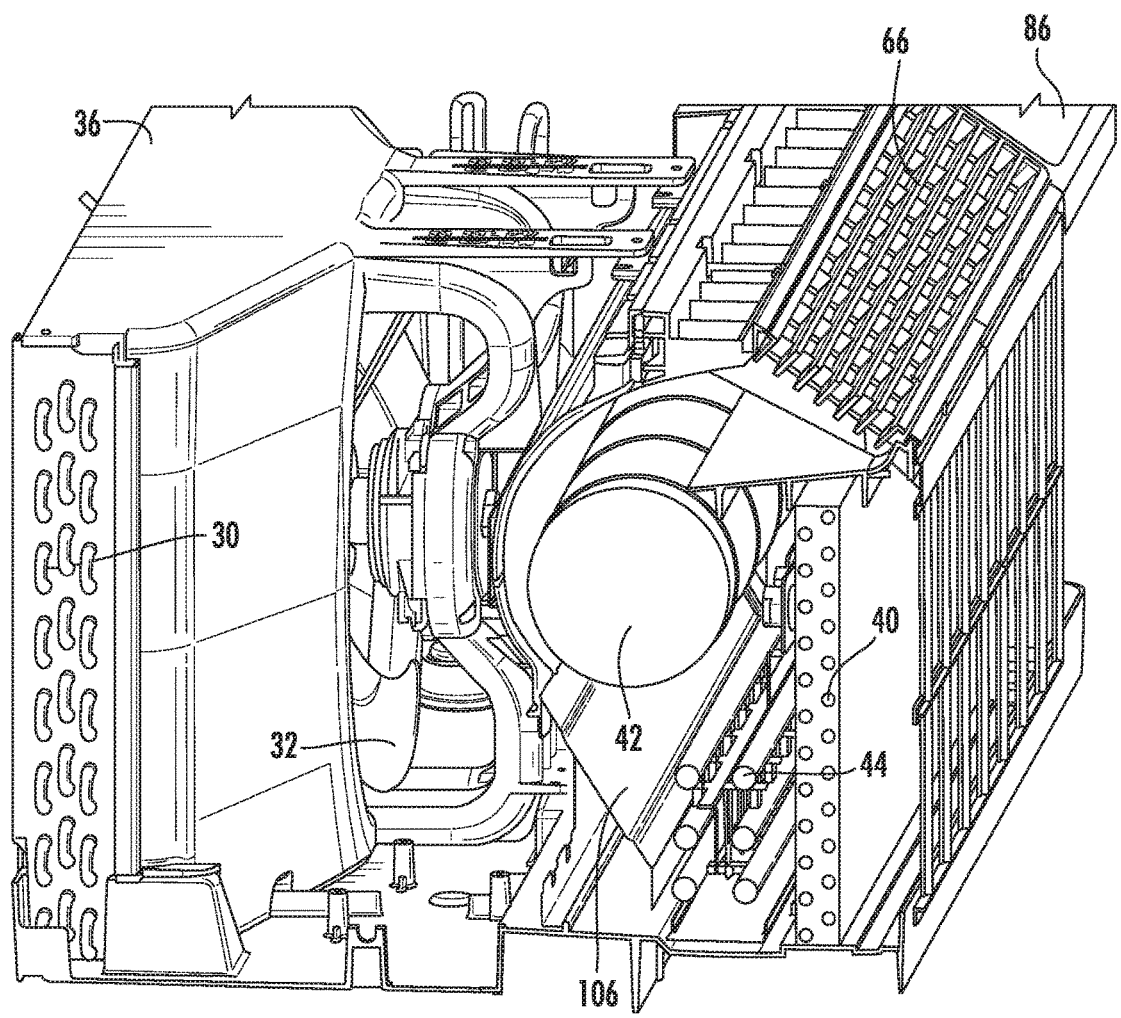
FIG. 9 is a perspective section view of components of an air conditioner unit in accordance with one embodiment of the present disclosure.

The operation of air conditioner unit 10 including compressor 34 (and thus refrigeration loop 48 generally) blower fan 42, outdoor fan 32 (FIG. 9), heating unit 44, expansion device 50, and other components of refrigeration loop 48 may be controlled by a processing device such as a controller 84. Controller 84 may be in communication (via for example a suitable wired or wireless connection) to such components of the air conditioner unit 10. By way of example, the controller 84 may include a memory and one or more processing devices such as microprocessors, CPUs or the like, such as general or special purpose microprocessors operable to execute programming instructions or micro-control code associated with operation of unit 10. The memory may represent random access memory such as DRAM, or read only memory such as ROM or FLASH. In one embodiment, the processor executes programming instructions stored in memory. The memory may be a separate component from the processor or may be included onboard within the processor.

Unit 10 may additionally include a control panel 86 and one or more user inputs 88, which may be included in control panel 86. The user inputs 88 may be in communication with the controller 84. A user of the unit 10 may interact with the user inputs 88 to operate the unit 10, and user commands may be transmitted between the user inputs 88 and controller 84 to facilitate operation of the unit 10 based on such user commands. A display 90 may additionally be provided in the control panel 86, and may be in communication with the controller 84. Display 90 may, for example be a touchscreen or other text-readable display screen, or alternatively may simply be a light that can be activated and deactivated as required to provide an indication of, for example, an event or setting for the unit 10.

Figure 4:
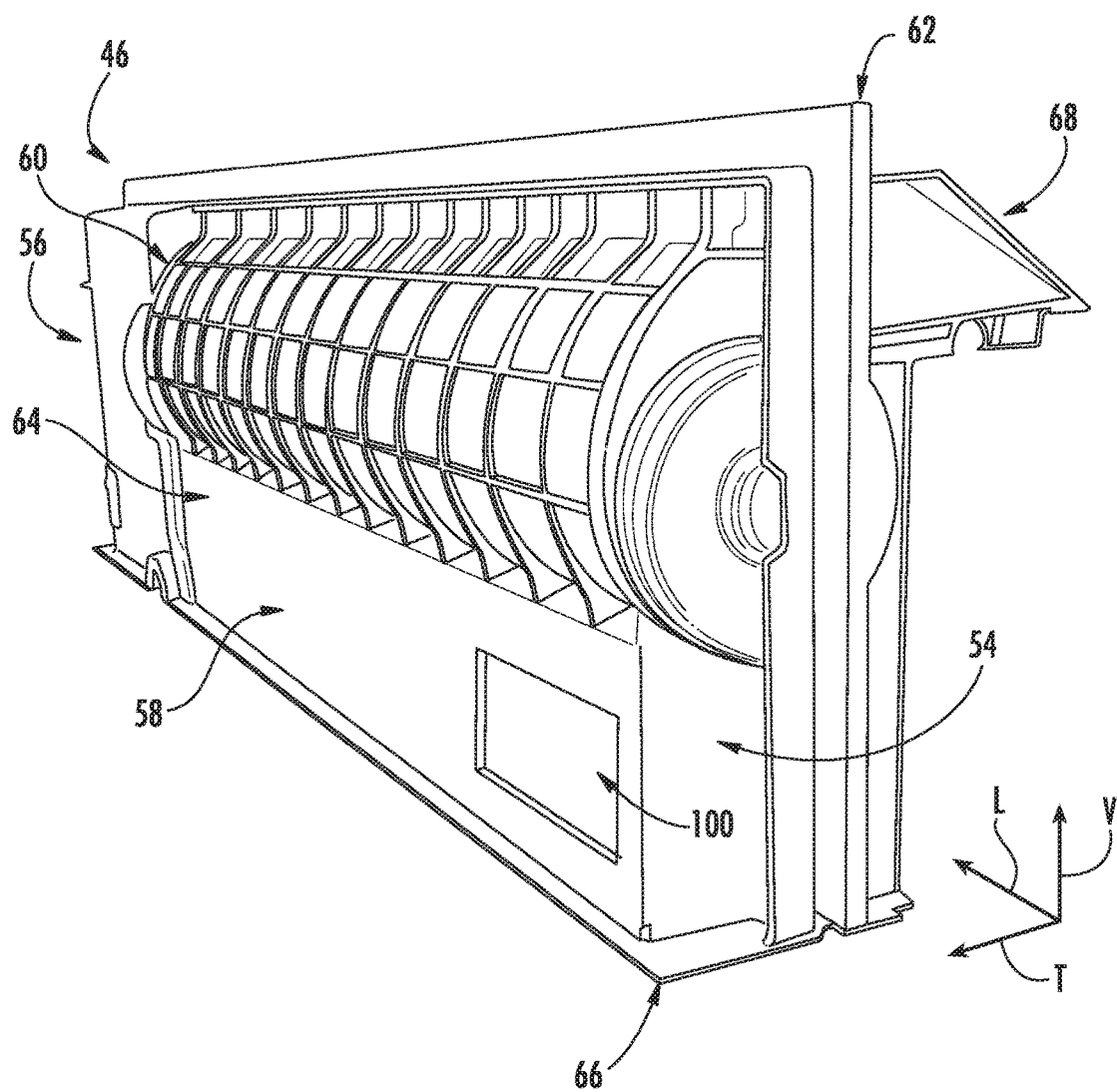
FIG. 4 is a rear perspective view of a bulkhead assembly in accordance with one embodiment of the present disclosure.
Figure 5:
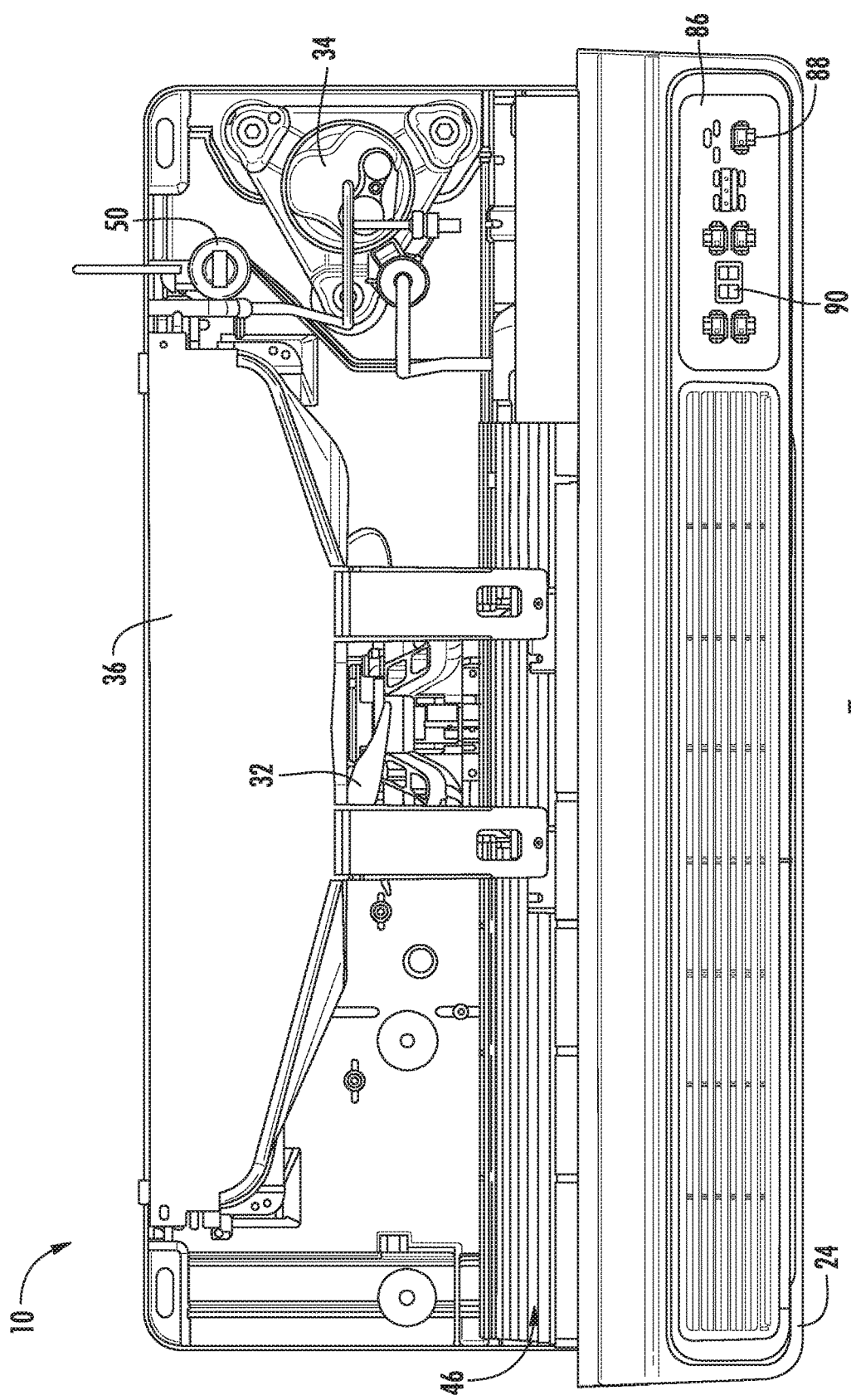
FIG. 5 is a top view of components of an air conditioner unit in accordance with one embodiment of the present disclosure.

Referring briefly to FIG. 4, a vent aperture 100 may be defined in the rear wall 58 of bulkhead 46. Vent aperture 100 may allow air flow therethrough between the indoor portion 12 and outdoor portion 14, and may be utilized in an installed air conditioner unit 10 to allow outdoor air to flow therethrough into the room through the indoor portion 12. In this regard, in some cases it may be desirable to allow outside air to flow into the room in order to compensate for negative pressure created within the room by, e.g., turning on a bathroom fan. In this manner, according to an exemplary embodiment, outside air, also referred to as make-up air, may be provided into the room through vent aperture 100 when a negative pressure is created as air is drawn out of the room by the bathroom fan.

Referring now generally to FIGS. 4 through 14, air conditioner unit 10 may further include one or more auxiliary fans 102 (see FIGS. 10 and 11) that may be used with the existing refrigeration loop 48 force additional outdoor air through vent aperture 100. Auxiliary fan 102 may, according to the illustrated example embodiment, be positioned within outdoor portion 14 proximate to vent aperture 100. Additionally or alternatively, auxiliary fan 102 may be partially or wholly disposed in vent aperture 100 or partially or wholly disposed in indoor portion 12. Accordingly, auxiliary fan 102 may induce a flow of outdoor air from the outdoors through vent aperture 100 to the indoor portion 12. According to the illustrated embodiment auxiliary fan 102 may be controlled by controller 84, or by any other suitable method.

Figure 10:
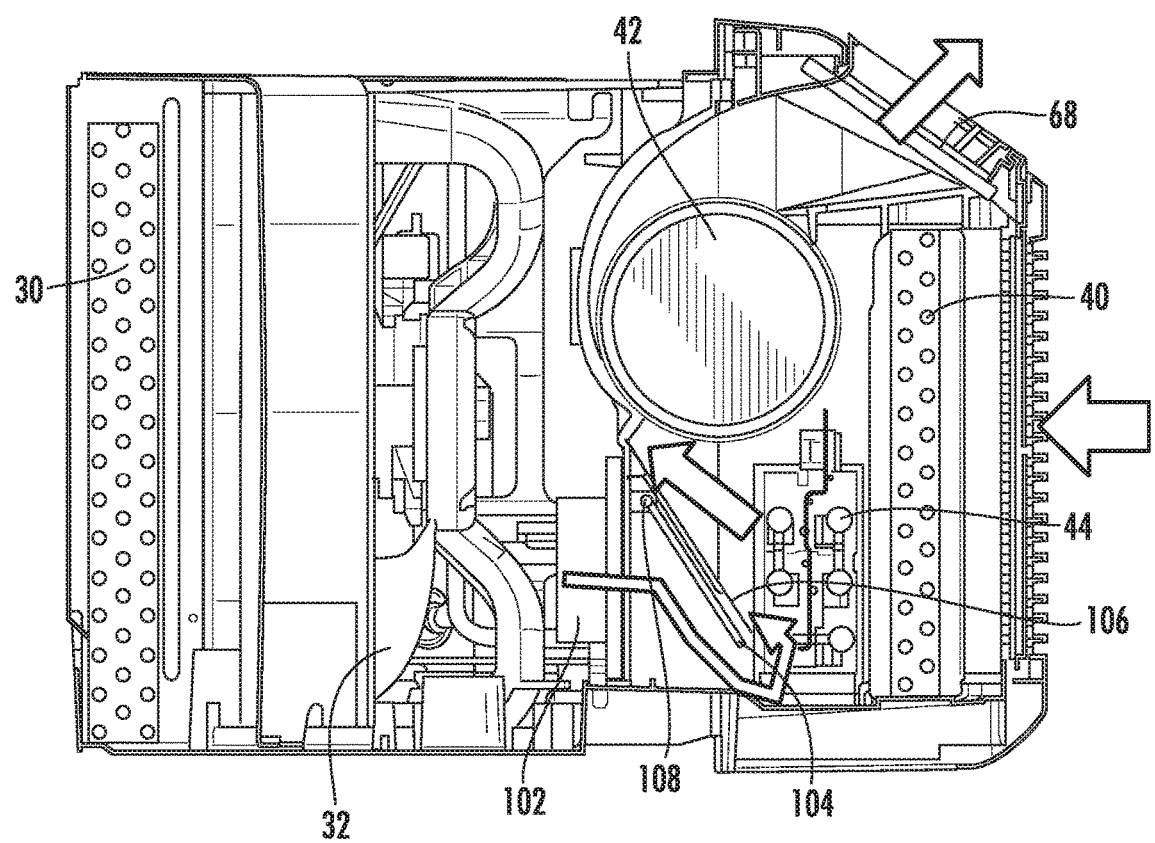
FIG. 10 is a side section view of components of an air conditioner unit in accordance with one embodiment of the present disclosure.
Figure 11:
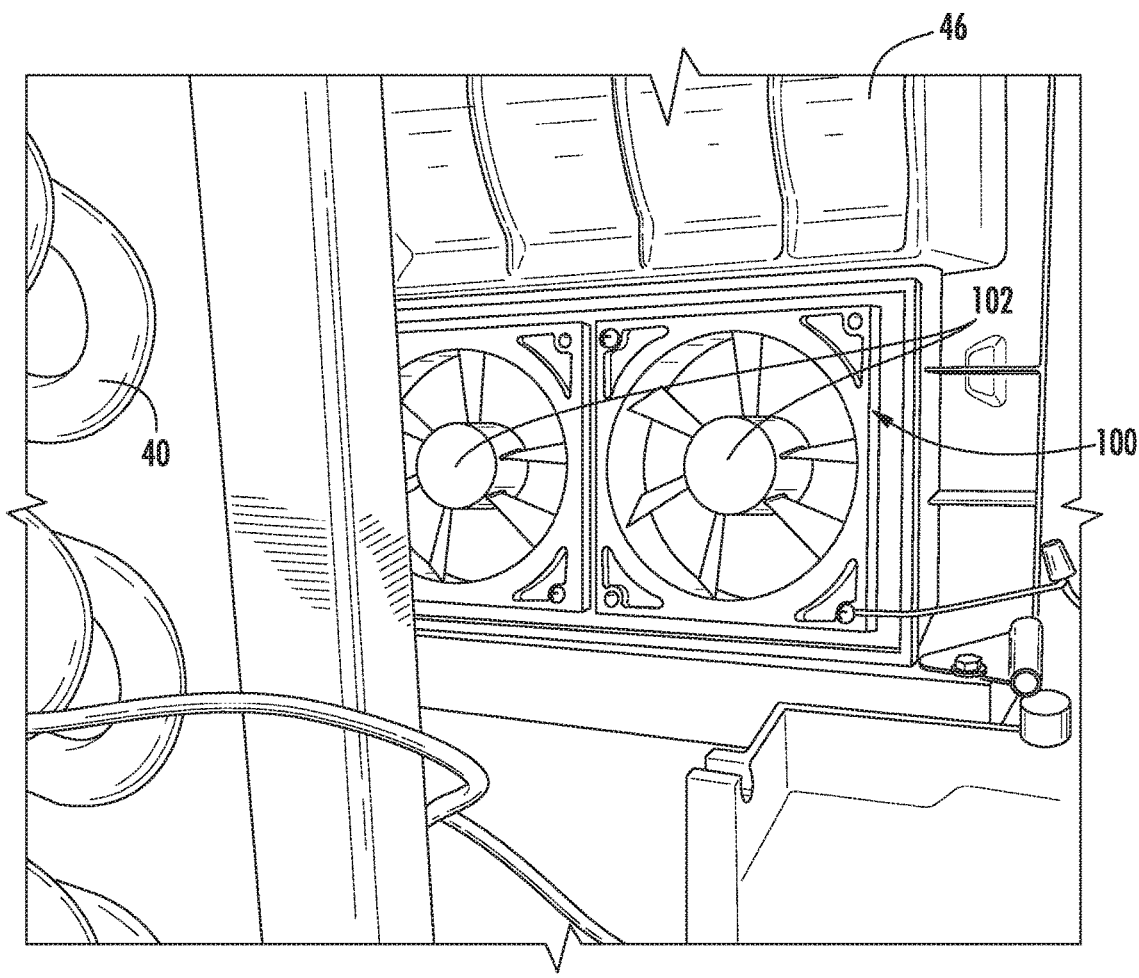
FIG. 11 is a rear perspective view of an auxiliary fan positioned within a vent aperture in accordance with on embodiment of the present disclosure.
Figure 12:
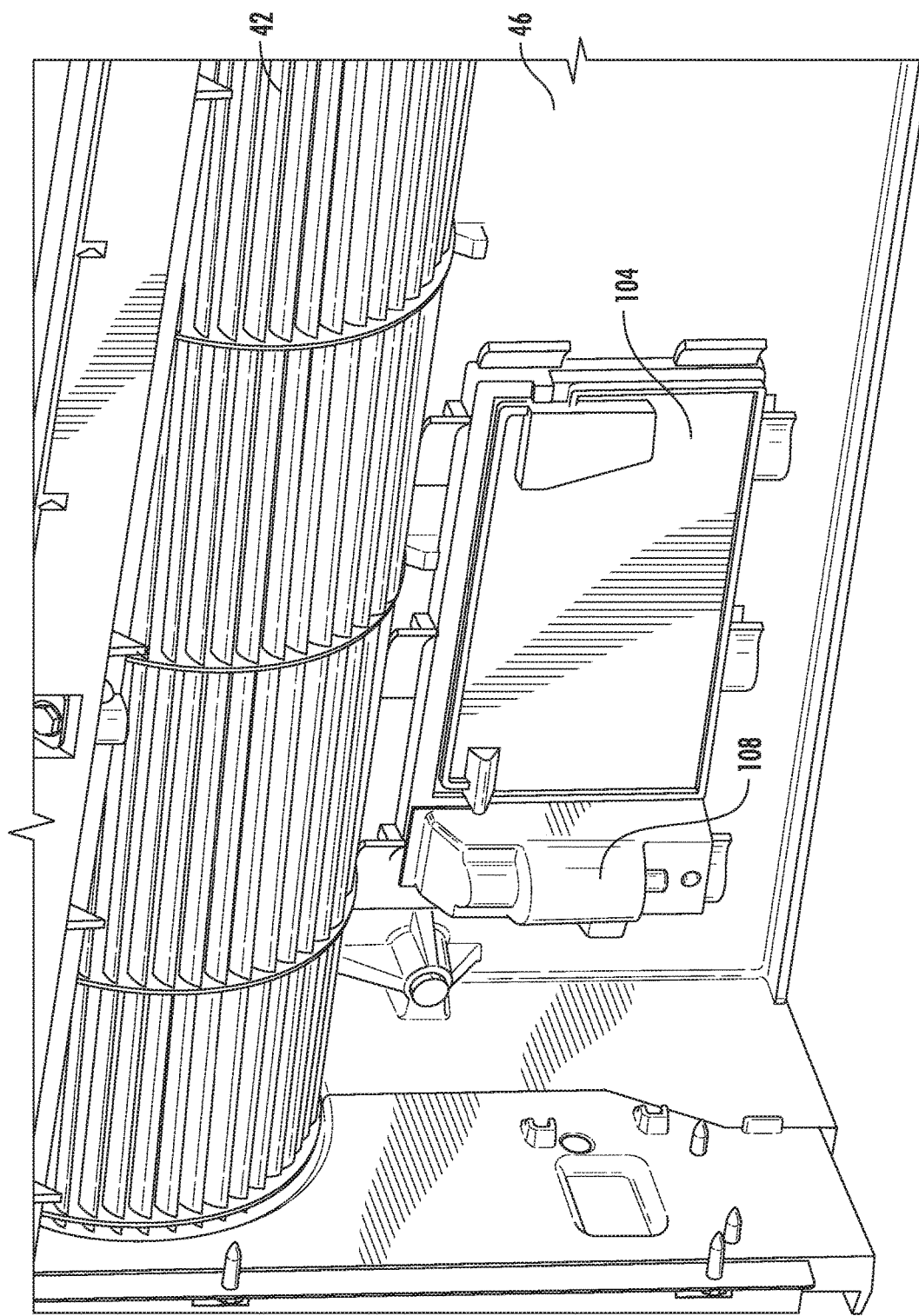
FIG. 12 is a front perspective view of the exemplary bulkhead assembly of FIG. 4 with a vent door illustrated in the closed position.
Figure 13:
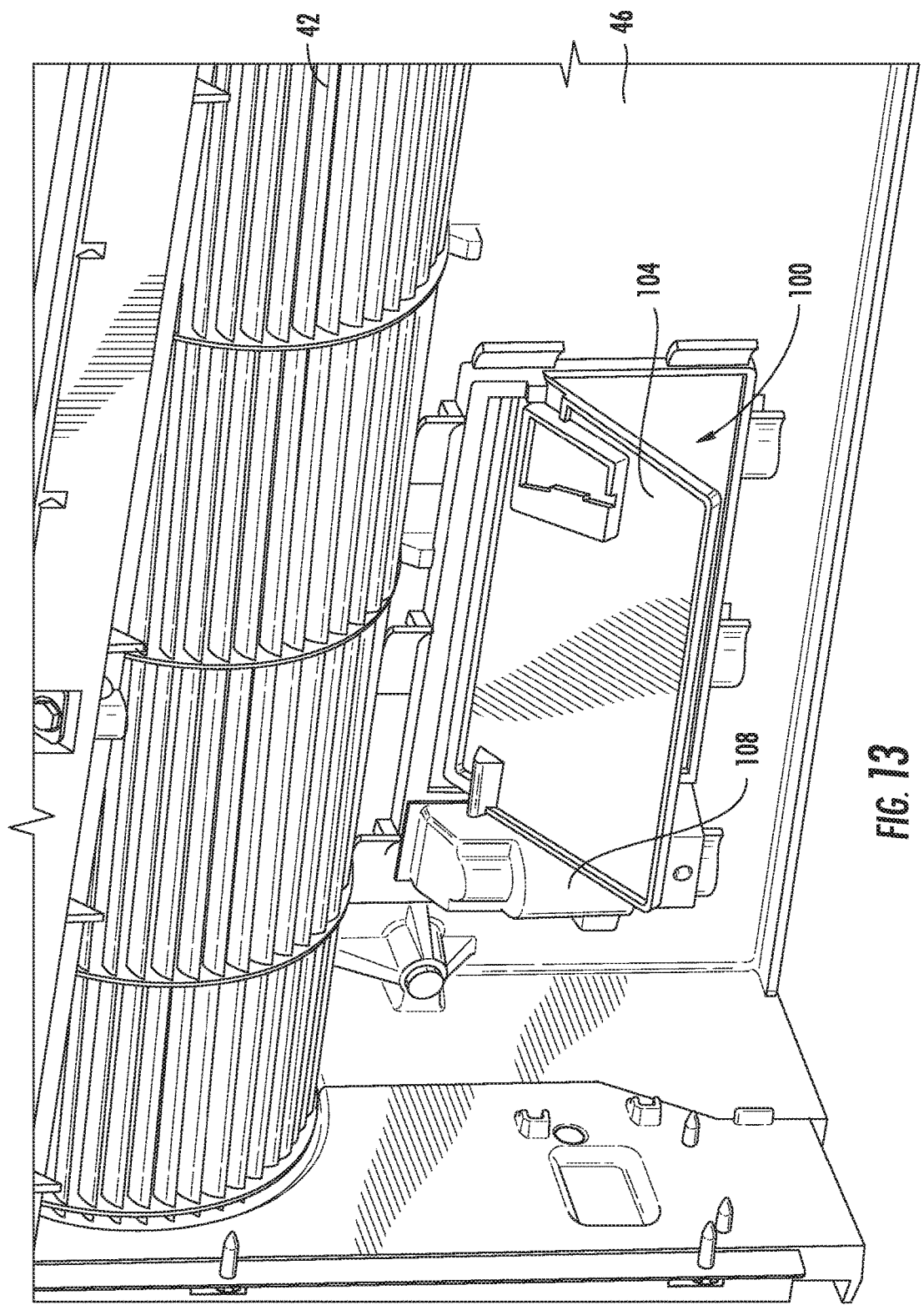
FIG. 13 is a front perspective view of the exemplary bulkhead assembly of FIG. 4 with the vent door illustrated in the open position.

A vent door 104 may be pivotally mounted to the bulkhead 46 proximate to vent aperture 100 to open and close vent aperture 100. More specifically, according to the illustrated embodiment shown in FIG. 10, vent door 104 is pivotally mounted to the indoor facing surface of indoor portion 12. Vent door 104 may be configured to pivot between a first, closed position where vent door 104 prevents air from flowing between outdoor portion 14 and indoor portion 12, and a second, open position where vent door 104 is positioned parallel to a heat shield 106 (as shown in FIG. 10) and allows make-up air to flow into the room. According to the illustrated embodiment vent door 104 may be pivoted between the open and closed position by an electric motor 108 controlled by controller 84, or by any other suitable method.

Figure 14:
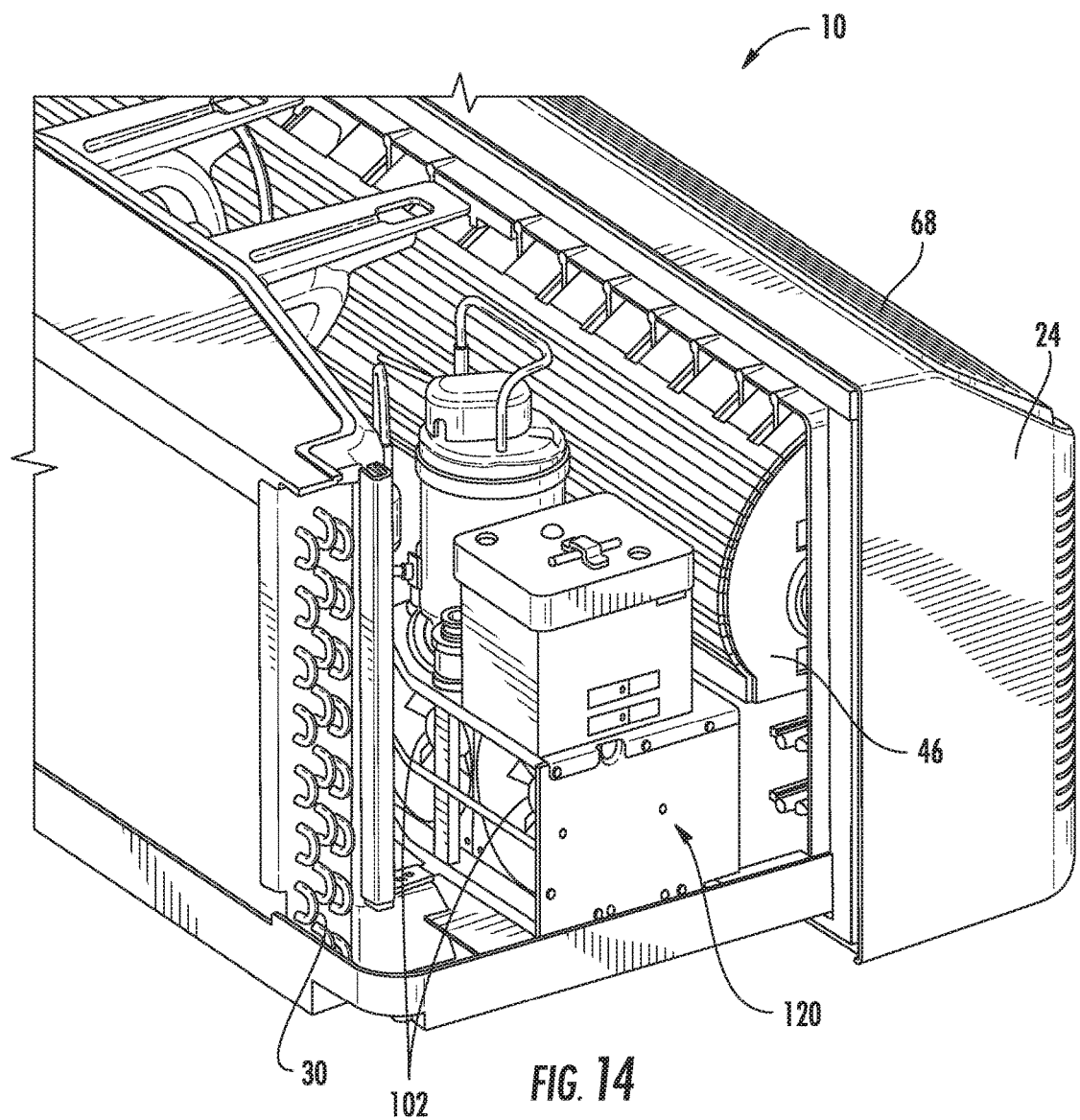
FIG. 14 is a rear perspective view of the exemplary bulkhead assembly of FIG. 4 including a sealed system for conditioning make-up air.

In some cases, it may be desirable to treat or condition make-up air flowing through vent aperture 100 prior to blowing it into the room. For example, outdoor air which has a relatively high humidity level may require treating before passing into the room. In addition, if the outdoor air is cool, it may be desirable to heat the air before blowing it into the room. Therefore, as illustrated in FIG. 14, unit 10 may further include an auxiliary sealed system 120 for conditioning make-up air. As illustrated, auxiliary fan 102 is configured as part of auxiliary sealed system 120 and may be configured for urging a flow of air through auxiliary sealed system 120. Auxiliary sealed system 120 may further includes one or more compressors, heat exchangers, and any other components suitable for operating auxiliary sealed system 120 similar to refrigeration loop 48 described above to condition make-up air.

Now that the construction of air conditioner unit 10 according to an exemplary embodiment has been presented, an exemplary method 200 of detecting the position of a vent door of a packaged terminal air conditioner will be described. Although the discussion below refers to the exemplary method 200 of operating air conditioner unit 10, one skilled in the art will appreciate that the exemplary method 200 is applicable to the operation of a variety of other air conditioning appliances including vent doors in different configurations. In exemplary embodiments, the various method steps as disclosed herein may be performed by controller 84.

Figure 15:
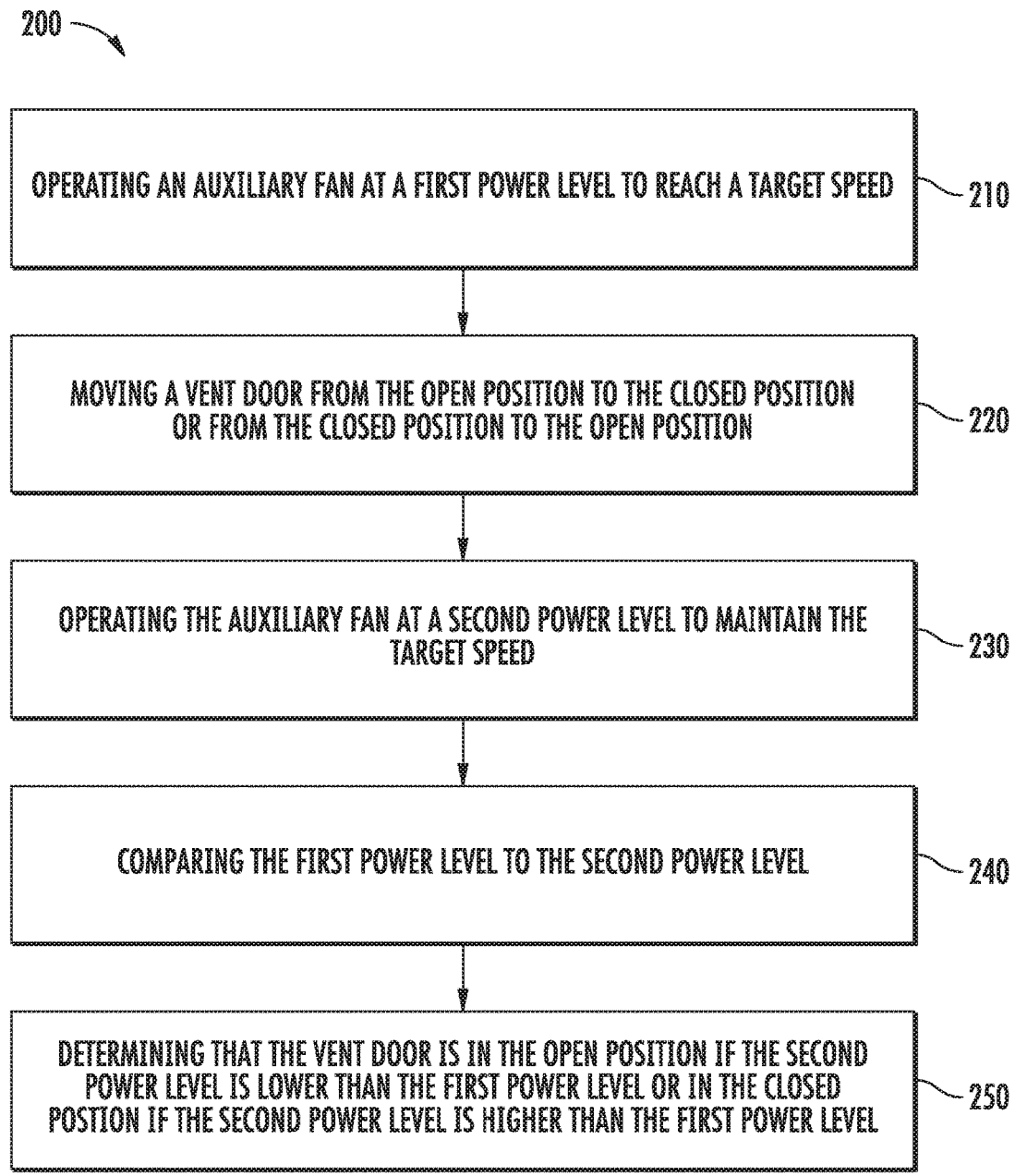
FIG. 15 illustrates a method for detecting the position of the vent door in accordance with one embodiment of the present disclosure.

Referring now to FIG. 15, method 200 includes, at step 210, operating an auxiliary fan at a first power level to reach a target speed. For example, controller 84 of packaged terminal air conditioner unit 10 may be configured for implementing method 200. In this regard, controller 84 may be configured for providing power and/or a control signal to auxiliary fan 102 to rotate it at the desired target speed.

According to exemplary embodiments of the present subject matter, the power level of auxiliary fan 102 is adjusted by manipulating a fan control signal. For example, the fan control signal may be any suitable digital control signal, such as a pulse width modulated signal having a duty cycle that is roughly proportional to the power level of auxiliary fan 102. In this regard, for example, a fifty percent duty cycle may drive auxiliary fan 102 at fifty percent of its rated speed, an eighty percent duty cycle may drive auxiliary fan 102 at eighty percent of its rated speed, etc. It should be appreciated that other means for controlling the power level and speed of auxiliary fan are possible and within the scope of the present subject matter.

The target speed of auxiliary fan 102 may be any speed suitable for generating enough pressure within the fan housing to be detectable when vent door 104 is closed. For example, the target speed may be fifty percent or eighty percent of the rated speed of auxiliary fan 102. It should be appreciated that auxiliary fan 102 includes a feedback loop that may be used to control the speed of auxiliary fan to the target speed. For example, after the target speed is selected, controller 84 may be configured for sensing the actual speed of auxiliary fan 102, e.g., using speed sensors or other suitable sensing mechanisms, and adjusting the control signal input to achieve the target speed.

Notably, the magnitude of the control signal needed to maintain the speed of auxiliary fan 102 at the target speed may vary depending on a variety of system parameters and conditions. For example, if there is a blockage in the flow path, the control signal may need to have a higher duty cycle to maintain the target speed than if there were no blockage. More specifically, for example, if vent door 104 is in the closed position, a higher duty cycle control signal would be required to maintain the speed of auxiliary fan 102 at the target speed, e.g., due to an increased pressure within the fan housing. By contrast, a lower duty cycle may be used to maintain the target speed of auxiliary fan 102 if vent door 104 is in the open position.

Therefore, according to an exemplary embodiment of the present subject matter, method 200 includes, at step 220, changing the position of the vent door after the auxiliary fan is at the target speed. In this manner, if the vent door is closed, step 220 includes moving the vent door to the open position. By contrast, if the vent door is in the open position, step 220 includes closing the vent door.

Notably, as described above, changing the position of the door will affect the magnitude of the fan control signal required to maintain the auxiliary fan at the target speed. Therefore, method 200 further includes, at step 230, operating the auxiliary fan at a second power level to maintain the target speed. As explained above, according to one exemplary embodiment, the second power level is a second duty cycle of a pulse width modulated control signal. In general, if the vent door moved from the open position to the closed position, the second power level will be higher than the first power level, e.g., to overcome the back pressure generated by the auxiliary fan within the fan housing. By contrast, if the vent door moved from the closed position to the open position, the second power level will be lower than the first power level, e.g., due to a lower pressure within the fan housing.

Notably, by comparing the power level required to operate the auxiliary fan at the target speed when the door is in the open position and the closed position, the position of the door may be determined without requiring any additional door position sensors, such as proximity sensors. Therefore, method 200 further includes, at step 240, comparing the first power level to the second power level. In addition, step 250 includes determining that the vent door is in the open position if the second power level is lower than the first power level or in the closed position if the second power level is higher than the first power level.

Regarding steps 210 and 230 where the auxiliary fan is operated at a first and second power level to reach and maintain the target speed, the auxiliary fan need only run long enough to reach the target speed. Thus, for example, each of these steps may only take around one second to ensure the auxiliary fan reaches and stabilizes at the target speed. Thus, according to the exemplary embodiment, step 210 of providing the first fan control signal to operate the auxiliary fan at the target speed includes running the auxiliary fan at the target speed for less than five seconds before moving the vent door. Similarly, step 230 of providing the second fan control signal to operate the auxiliary fan at the target speed may include running the auxiliary fan at the target speed for less than five seconds before determining whether the vent door is in the open position or the closed position. In this manner, the entire door position detection method may take only a few seconds to complete.

According to exemplary embodiments of the present subject matter, a determination regarding the position of the vent door may require that the first and second power levels be different by a predetermined amount. In this regard, for example, step 250 may include determining that the vent door is in the open position if the second duty cycle is lower than the first duty cycle by a predetermined amount or determining that the vent door is in the closed position if the second duty cycle is higher than the first duty cycle by the predetermined amount. The predetermined amount or threshold may be set by an end user or the manufacturer. According to one embodiment, the predetermined amount is a percentage difference in control signal duty cycle, e.g., larger than a three percent difference in duty cycle. According to another exemplary embodiment, the difference between the first power level and the second power level must be a six percent power difference or greater to determine the position of the vent door has changed.

According to an alternative embodiment of the present subject matter, a comparison between a first power level and a second power level is not required. In this regard, for example, if the operating parameters and conditions of a given PTAC are well known, the controller may be programmed for determining the position of the vent door by simply running the auxiliary fan at a target speed and determining whether the door is open or closed based on the power level required to achieve that target speed. Thus, for example, the controller may be programmed to operate the fan at fifty percent of its rated speed. In addition, the controller may determine that the vent door is closed if the power level required to reach this target speed is above some threshold power level. For example, if the duty cycle of the pulse width modulated signal required to achieve the fifty percent target speed is greater than seventy percent, the controller may determine that the vent door is closed. By contrast, if the duty cycle is sixty percent or less, the controller may determine that the vent door is open. It should be appreciated that these power level thresholds are used only for explaining aspects of the present subject matter. Any suitable thresholds may be selected which are suitable for use in determining the position of the vent door.

The construction of unit 10 and the methods described above provide a means for monitoring the position of a vent door on a packaged terminal air conditioner unit. Moreover, the system and method described requires no additional components or sensors because they utilize components already present in conventional PTACs with make-up air modules. By monitoring the position of the vent door, energy losses may be minimized, system efficiency may be increased, and building code regulations may be satisfied. In addition, fewer components are needed, so costs are reduced, assembly is simplified, reliability is increased, and maintenance costs are reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A packaged terminal air conditioner unit, comprising:
   a bulkhead defining an indoor portion and an outdoor portion;
   a vent aperture defined in the bulkhead;
   an auxiliary fan mounted to the bulkhead and over the vent aperture and being configured for urging a flow of make-up air from the outdoor portion through the vent aperture to the indoor portion;
   a vent door positioned over the vent aperture, the vent door being pivotable between an open position for allowing the flow of make-up air through the vent aperture and a closed position for blocking the flow of make-up air through the vent aperture; and
   a controller operably coupled to the auxiliary fan and the vent door, the controller being configured for:
      providing a first fan control signal to operate the auxiliary fan to reach a target speed;
      moving the vent door from the open position to the closed position or from the closed position to the open position;

providing a second fan control signal to operate the auxiliary fan to maintain the target speed; and
determining whether the vent door is in the open position or the closed position by comparing the first fan control signal and the second fan control signal.

2. The packaged terminal air conditioner unit of claim 1, wherein the first fan control signal is a pulse width modulated signal having a first duty cycle and the second fan control signal is a pulse width modulated signal having a second duty cycle, and wherein determining whether the vent door is in the open position or the closed position comprises:
determining that the vent door is in the open position if the second duty cycle is lower than the first duty cycle, or
determining that the vent door is in the closed position if the second duty cycle is higher than the first duty cycle.

3. The packaged terminal air conditioner unit of claim 1, wherein the first fan control signal is a pulse width modulated signal having a first duty cycle and the second fan control signal is a pulse width modulated signal having a second duty cycle, and wherein determining whether the vent door is in the open position or the closed position comprises:
determining that the vent door is in the open position if the second duty cycle is lower than the first duty cycle by a predetermined amount, or
determining that the vent door is in the closed position if the second duty cycle is higher than the first duty cycle by the predetermined amount.

4. The packaged terminal air conditioner unit of claim 3, wherein the predetermined amount is greater than a three percent difference between the first duty cycle and the second duty cycle.

5. The packaged terminal air conditioner unit of claim 3, wherein the predetermined amount is a six percent difference between the first duty cycle and the second duty cycle.

6. The packaged terminal air conditioner unit of claim 1, wherein the auxiliary fan is positioned within the outdoor portion adjacent the vent aperture and the vent door is positioned within the indoor portion over the vent aperture.

7. The packaged terminal air conditioner unit of claim 1, wherein the auxiliary fan is part of a sealed system configured for conditioning the flow of make-up air passing through the vent aperture.

8. The packaged terminal air conditioner unit of claim 1, wherein providing the first fan control signal to operate the auxiliary fan at the target speed comprises running the auxiliary fan at the target speed for less than five seconds before moving the vent door.

9. The packaged terminal air conditioner unit of claim 1, wherein providing the second fan control signal to operate the auxiliary fan at the target speed comprises running the auxiliary fan at the target speed for less than five seconds before determining whether the vent door is in the open position or the closed position.

10. A method for detecting a position of a vent door of a packaged terminal air conditioner unit, the vent door being pivotally mounted over a vent aperture defined in a bulkhead of the packaged terminal air conditioner unit and being movable between an open position and a closed position, the packaged terminal air conditioner unit comprising an auxiliary fan for urging a flow of make-up air through the vent aperture, the method comprising:
operating the auxiliary fan mounted to the bulkhead and over the vent aperture, at a first power level to reach a target speed;
moving the vent door from the open position to the closed position or from the closed position to the open position;
operating the auxiliary fan mounted to the bulkhead and over the vent aperture, at a second power level to maintain the target speed;
comparing the first power level to the second power level; and
determining that the vent door is in the open position if the second power level is lower than the first power level or in the closed position if the second power level is higher than the first power level.

11. The method of claim 10, wherein the first power level is a first duty cycle of a pulse width modulated signal and the second power level is a second duty cycle of the pulse width modulated signal, and wherein determining whether the vent door is in the open position or the closed position comprises:
determining that the vent door is in the open position if the second duty cycle is lower than the first duty cycle by a predetermined amount, or
determining that the vent door is in the closed position if the second duty cycle is higher than the first duty cycle by the predetermined amount.

12. The method of claim 11, wherein the predetermined amount is greater than a three percent difference between the first duty cycle and the second duty cycle.

13. The method of claim 11, wherein the predetermined amount is a six percent difference between the first duty cycle and the second duty cycle.

14. The method of claim 10, wherein operating the auxiliary fan at the first power level to reach the target speed comprises running the auxiliary fan at the target speed for less than five seconds before moving the vent door, and
wherein operating the auxiliary fan at the second power level to maintain the target speed comprises running the auxiliary fan at the target speed for less than five seconds before comparing the first power level to the second power level.

15. A method for detecting a position of a vent door of a packaged terminal air conditioner unit, the vent door being pivotally mounted over a vent aperture defined in a bulkhead of the packaged terminal air conditioner unit and being movable between an open position and a closed position, the packaged terminal air conditioner unit comprising an indoor fan, an outdoor fan and an auxiliary fan for urging a flow of make-up air through the vent aperture, the method comprising:
operating the auxiliary fan mounted to the bulkhead and over the vent aperture, at a power level to reach a target speed;
determining that the vent door is in the open position or the closed position based on the power level.

16. The method of claim 15, wherein the power level is a duty cycle of a pulse width modulated signal and determining that the vent door is in the open or the closed position comprises:
determining that the vent door is in the open position if the duty cycle is less than fifty percent; and
determining that the vent door is in the closed position if the duty cycle is greater than fifty percent.

17. The method of claim 15, wherein the power level is a first power level, and wherein determining that the vent door is in the open position or the closed position comprises:
moving the vent door from the open position to the closed position or from the closed position to the open position;

operating the auxiliary fan at a second power level to maintain the target speed;

comparing the first power level to the second power level; and determining that the vent door is in the open position if the second power level is lower than the first power level or in the closed position if the second power level is higher than the first power level.

18. The method of claim 17, wherein the first power level is a first duty cycle of a pulse width modulated signal and the second power level is a second duty cycle of the pulse width modulated signal, and wherein determining whether the vent door is in the open position or the closed position comprises:

determining that the vent door is in the open position if the second duty cycle is lower than the first duty cycle by a predetermined amount, or determining that the vent door is in the closed position if the second duty cycle is higher than the first duty cycle by the predetermined amount.

19. The method of claim 18, wherein the predetermined amount is a six percent difference between the first duty cycle and the second duty cycle.

20. The method of claim 15, wherein operating the auxiliary fan at the power level to reach the target speed comprises running the auxiliary fan at the target speed for less than five seconds before determining that the vent door is in the open position or the closed position.

* * * * *